United States Patent
Pretorius et al.

[11] Patent Number: 6,138,654
[45] Date of Patent: Oct. 31, 2000

[54] PIEZOELECTRIC IGNITION AND SENSING DEVICE

[75] Inventors: Jacob van Reenan Pretorius, Cambridge; Marthinus Cornelius van Schoor, Medford, both of Mass.

[73] Assignee: Midé Technology Corporation, Cambridge, Mass.

[21] Appl. No.: 09/173,144

[22] Filed: Oct. 15, 1998

[51] Int. Cl.[7] .................................................. F02P 3/12
[52] U.S. Cl. ..................... 123/642; 123/406.41; 315/55; 73/35.13
[58] Field of Search .................. 123/642, 406.41, 123/406.42, 406.43; 315/55; 73/35.13, 115

[56] References Cited

U.S. PATENT DOCUMENTS

| | | | |
|---|---|---|---|
| 3,215,133 | 11/1965 | Farrell | 123/642 |
| 3,349,760 | 10/1967 | Horan | 123/642 |
| 3,361,929 | 1/1968 | Vandover | 315/55 |
| 3,957,023 | 5/1976 | Peterson | 123/117 R |
| 4,095,580 | 6/1978 | Murray et al. | 123/32 SJ |
| 4,169,388 | 10/1979 | Teitelbaum et al. | 73/714 |
| 4,190,027 | 2/1980 | Inui et al. | 123/117 R |
| 4,266,427 | 5/1981 | Wesley | 73/119 A |
| 4,392,082 | 7/1983 | Harada | 315/55 |
| 4,412,151 | 10/1983 | Norris | 315/55 |
| 4,508,079 | 4/1985 | Komurasaki et al. | 123/425 |
| 4,601,197 | 7/1986 | Fattic et al. | 73/117.3 |
| 4,622,939 | 11/1986 | Matekunas | 123/425 |
| 4,767,967 | 8/1988 | Tanaka et al. | 315/55 |
| 4,881,403 | 11/1989 | Kagawa et al. | 73/115 |
| 5,291,872 | 3/1994 | Ghaem | 123/620 |
| 5,327,866 | 7/1994 | Kitajima | 123/406 |
| 5,479,817 | 1/1996 | Suzuki et al. | 73/115 |
| 5,715,801 | 2/1998 | Murasawa et al. | 315/55 |

FOREIGN PATENT DOCUMENTS

| | | | |
|---|---|---|---|
| 2 367 199 | 9/1978 | France | 123/342 |
| 2 514 077 | 4/1983 | France | 123/342 |
| 26 07 264 | 9/1976 | Germany | 123/342 |
| 2 036 173 | 6/1980 | United Kingdom | 123/342 |

*Primary Examiner*—Erick Solis
*Attorney, Agent, or Firm*—Choate, Hall & Stewart; Elizabeth E. Nugent

[57] ABSTRACT

A spark plug comprising a piezoelectric element that strains with the increase in pressure in the cylinder of an internal combustion engine, and methods of making and using such a spark plug. The strain on the element generates a voltage across the poles of the piezoelectric element that varies with the cylinder pressure. This voltage can be monitored to determine the pressure in the cylinder. The voltage will increase until it is sufficient to create a spark between two poles that will be used to ignite the fuel-air mixture in the cylinder. The voltage may be further increased by using the increasing cylinder pressure to accelerate a striker mass to impact the piezoelectric element. After ignition, the piezoelectric element strains further because of the rapid increase in pressure due to the combustion process. Sensing the voltage output after combustion can provide information about the engine cycle and indicate any anomalies such as pre-ignition, misfire, or knock.

19 Claims, 6 Drawing Sheets

PIEZOELECTRIC IGNITION AND SENSING DEVICE

FIELD OF THE INVENTION

This invention relates to a piezoelectric spark plug which ignites a fuel-air mixture in response to an increase in cylinder pressure, and to methods of using the spark plug. The invention further relates to spark plugs having integrated piezoelectric pressure sensors.

BACKGROUND OF THE INVENTION

Spark ignition internal combustion engines generally comprise one or more cylinders which act to compress a fuel-air mixture. The compressed mixture is ignited at a selected instant by a spark plug to drive the piston to provide energy. The timing of the spark is crucial to engine performance, affecting both work output and engine emissions.

Spark plugs are conventionally grounded to the engine body and electrically coupled to a distribution wire which delivers a high-voltage signal to produce the spark. Timing is controlled by an external distributor. The high voltage required by conventional spark plugs can interfere with radio reception and represent a hazard to repair personnel.

Because of these problems, it has been proposed in U.S. Pat. No. 4,412,151 to Norris to create a spark plug which is receptive to a low voltage signal. The low voltage signal activates a device such as a striker which impacts a piezoelectric element. The piezoelectric element develops a high voltage as a result of the impact and generates a spark to ignite the fuel-air mix.

While the spark plug of Norris allows the elimination of high-voltage wires from most accessible parts of the engine, it is still subject to timing difficulties. Further, fatigue becomes a significant consideration when a striker apparatus is used in a device which must endure for thousands of hours at speeds of 50 cycles per second or more. Minimization of the number of moving parts is desirable for any improved type of plug.

A need therefore exists for a spark plug which can automatically control cylinder timing in response to cylinder pressure, and which eliminates the need for external high-voltage wires. Ideally, such a spark plug would be compatible with existing engines, and would have a lifetime similar to or longer than a conventional spark plug. There also exists a need for a spark plug capable of providing information relevant to combustion efficiency and proper engine timing.

SUMMARY OF THE INVENTION

The present invention relates to a spark plug comprising a piezoelectric element that strains with the increase in pressure in the cylinder of an internal combustion engine. The strain on the element generates a voltage across the poles of the piezoelectric element that varies with the cylinder pressure. This voltage can be monitored to determine the pressure in the cylinder. The voltage will increase until it is sufficient to create a spark between two poles that will be used to ignite the fuel-air mixture in the cylinder. The voltage may be further increased by using the increasing cylinder pressure to accelerate a striker mass to impact the piezoelectric element. The time of spark may be determined by the engine controller, the pressure inside the engine or a pre-set timing device. After ignition, the piezoelectric element strains further because of the rapid increase in pressure due to the combustion process. Sensing the voltage output after combustion can provide information about the engine cycle and indicates any anomalies such as pre-ignition, misfire, and knock.

In one aspect, the invention includes a spark plug for an internal combustion engine, in which a piezoelectric element responds to cylinder pressure by generating a voltage sufficient to produce a spark for igniting a fuel-air mixture in the cylinder. The voltage may be increased by including a striker element which impacts the piezoelectric element, either directly or through an electrode, in response to the pressure increase in the cylinder. The piezoelectric element may be PZT or another piezoelectric material, and may be constructed as a composite of a plurality of subelements. The spark plug may include a heat shield to protect the piezoelectric element from the cylinder gases; this shield may comprise, for example, nickel-base alloys, iron-chromium-nickel alloys, titanium boride, zirconium diboride, boron carbide, or metal-inorganic binder systems.

The spark plug may include an output for measuring pressure response of the piezoelectric element to detect combustion performance, and may also include means for timing the spark, which may be based on any combination of pressure, pressure rate, and crank angle. The timing may be determined by a local logic element or by an engine controller. The charge from the piezoelectric element may be accumulated in a capacitor, and discharged through the electrodes in response to the timing means.

In another aspect, the invention includes a method of igniting a fuel-air mixture in an internal combustion engine, which comprises compressing the fuel-air mixture in a combustion chamber in communication with a piezoelectric element, thereby developing a voltage across the element which is used to produce a spark to ignite the fuel-air mixture. The piezoelectric element may develop its voltage in response to impact of a striker element. Charge may be stored in a capacitor as it is developed, and the capacitor may then be discharged to create the spark. Spark timing may be controlled by any combination of pressure, pressure rate, and crank angle. The piezoelectric element may be monitored to obtain information about cylinder pressure, which may be used to monitor engine performance.

In still another aspect, the invention includes a method of controlling ignition timing in an internal combustion engine, by placing a piezoelectric element in communication with a combustion chamber in a manner which allows it to produce an ignition spark when a certain cylinder pressure is reached.

In a further aspect, the invention includes a method of monitoring engine performance. In an engine having a spark plug which produces an ignition spark by developing a voltage across a piezoelectric element in response to cylinder pressure, the method includes monitoring the piezoelectric element after ignition in order to detect combustion performance. The method may also include modifying spark timing in response to the detected combustion performance.

The term "cylinder," as it is used herein, includes any fuel-air combustion chamber in an internal combustion engine. In particular, it includes the combustion chamber in rotary engines, as well as the combustion chamber in more common piston engines. Similarly, the "stroke" of an engine includes both a traditional piston stroke and the turning of the rotor in a rotary engine.

The invention is described below with reference to a carbureted engine, in which a fuel-air mixture is introduced into the cylinder, but it will be apparent to those skilled in the art that the invention is equally applicable to fuel injected engines. Both types of engines are intended to be encompassed within the scope of the invention.

BRIEF DESCRIPTION OF THE DRAWING

The invention is described with reference to the several figures of the drawing, in which.

DETAILED DESCRIPTION

The present invention relies on the piezoelectric effect for operation. This effect was discovered in the late 1800's, and has been defined as polarization of electrical charge produced by mechanical strain, the polarization being proportional to the amount of strain.

Figure 1:
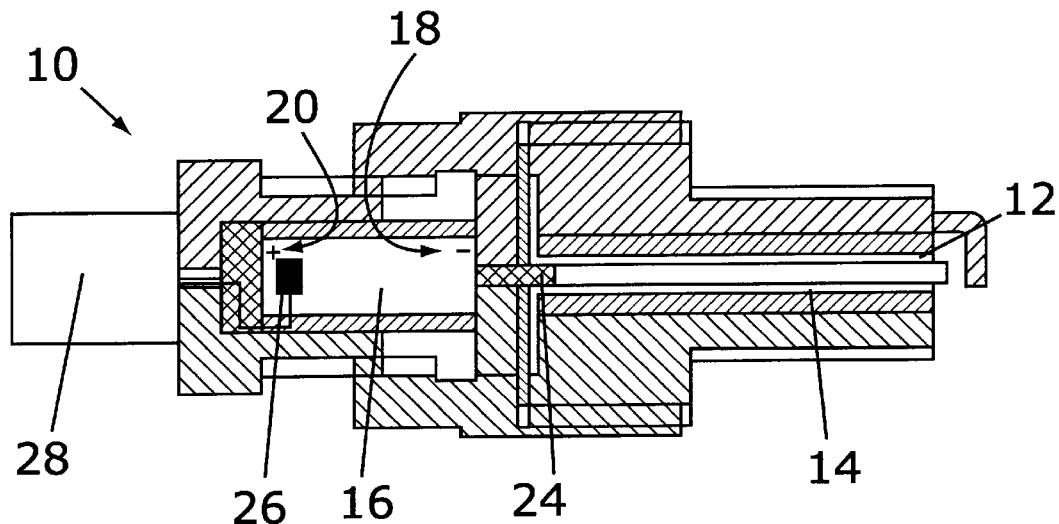
FIG. 1 shows a spark plug according to the invention.

FIGS. 1 and 2 show two embodiments of a spark plug according to the invention. The illustrated embodiments are integrable into standard internal combustion engines with minimal changes to the engine. Each spark plug comprises a communication port, a pressure chamber, a piezoelectric element and an electronic logic circuit.

The cycle of a four-stroke engine is divided into four phases: (i) exhaust, (ii) intake, (iii) compression, (iv) expansion (power). The invention can also be used in two-stroke engines, in which the exhaust and intake strokes are combined with the compression and expansion strokes, respectively. During the compression stroke, the fuel air mixture that has been taken into the cylinder during the intake cycle is compressed by reducing the volume of the cylinder. The pressure inside the cylinder rises as the volume is decreased.

With reference to FIG. 1, the spark plug 10 has its nose in contact with a captive gasket exposed to the inside of the cylinder. The communications port inlet 12 is thus exposed to the rising pressure in the cylinder. This will cause the pressure inside the pressure chamber 14 to increase with that in the cylinder. An increase in the pressure inside the pressure chamber 14 will result in mechanical strain on a piezoelectric element 16. According to the piezoelectric effect, this will produce an electrical charge over the poles 18 and 20 of the element 16.

Figure 2A:
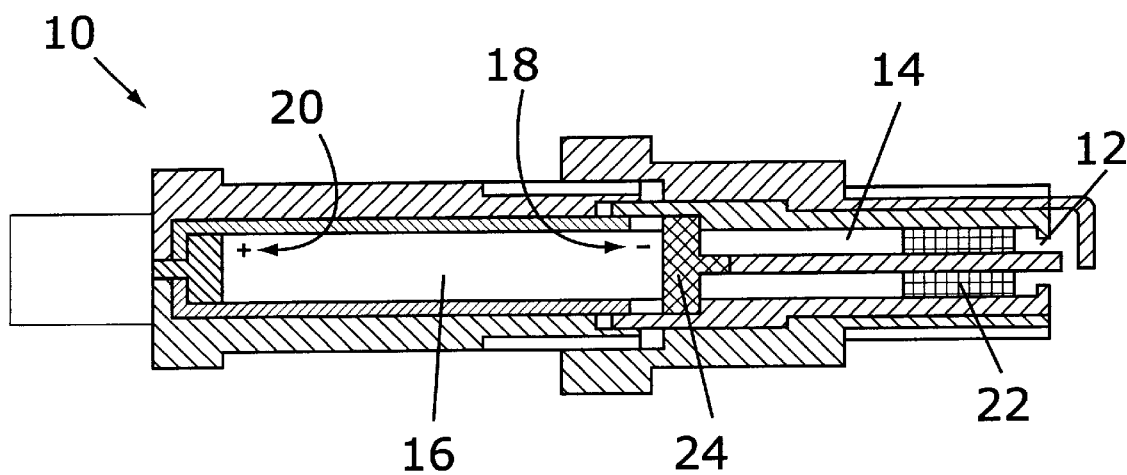
FIGS. 2A and 2B are cutaway and exploded perspective views of another embodiment of a spark plug according to the invention.
Figure 2B:
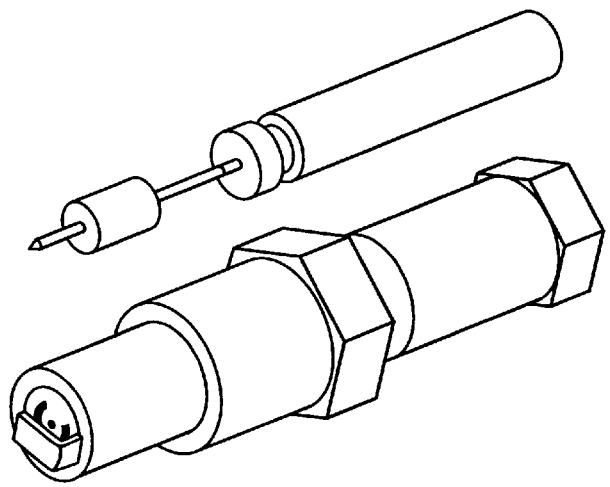

In the embodiment illustrated in FIGS. 2A and 2B, the spark plug further comprises a striker element 22. The striker 22 moves in response to increasing cylinder pressure to impact the piezoelectric element 16. The impact may be direct, or it may be transmitted through heat shield 24. The use of the striker 22 increases the strain on the piezoelectric element 16, thereby allowing the requisite voltage to be obtained with piezoelectric materials having a lower value of $g_{33}$, as further discussed below.

After striking the piezoelectric element, the striker 22 is pulled back into its original position in the nose of the spark plug by the vacuum produced by motion of the piston during the intake cycle.

When a striker element is used, attention should be paid to fatigue and wear considerations for the striker 22 and the surface struck (either the heat shield 24 or the piezoelectric element 16). Soft and/or ductile heat shields, such as nickel-based inorganic binder systems, may reduce fatigue while still maintaining thermal insulation of the piezoelectric element.

In the embodiments illustrated in FIG. 1, the low voltage difference signal between the ground electrode 42 and the local electrode 26 is sent to a local controller 28, which interprets the data as fully described below. The local controller is in turn connected to a switch 30, which controls the timing of the spark. Power for the local controller circuit can be supplied by an integrated battery or by an external power source such as the vehicle battery (not shown).

The device uses the electrical charge in two ways. First it provides a real time pressure sensor and secondly it will use the charge to create the spark needed to ignite the fuel-air mixture. This charge can be stored in a capacitor (shown in FIG. 6 as 32), enabling discharge by closing the switch 30 at a selected time, which can be determined by the logic circuit 28 using the pressure data provided by the piezoelectric element 16. The piezoelectric element may comprise any of a variety of piezoelectric materials known in the art; these include, but are not limited to, lead zirconate titanate (PZT) formulations. The element may be polycrystalline or a single crystal.

In its capacity as a pressure sensor, the spark plug allows fine adjustment of the spark timing within each stroke for each individual cylinder. The two factors that exert the greatest influence on optimal spark timing (maximum brake torque or MBT) are load and engine speed. Secondary parameters which also influence the MBT timing include engine temperature, intake air temperature, and fuel quality. The relationship between engine load, engine speed, and optimum spark timing is quite complex, but methods of determining MBT timing given these inputs are known in the art. The present invention provides improved methods for determining these parameters so that spark timing can be calculated for each cylinder individually. Prior art measurements of engine load, in particular, are measured as an average for all cylinders, as are temperature measurements.

Engine load is directly related to cylinder pressure, while engine speed is closely tied to the rate of change of the cylinder pressure. By measuring both these quantities, an optimum spark time can be computed by the local controller, as described below with reference to FIG. 6. In some embodiments, data describing cylinder pressure and pressure rate can be sent to the engine controller, which can also integrate secondary factors such as engine temperature and intake air temperature to calculate an optimum spark timing.

Figure 3:
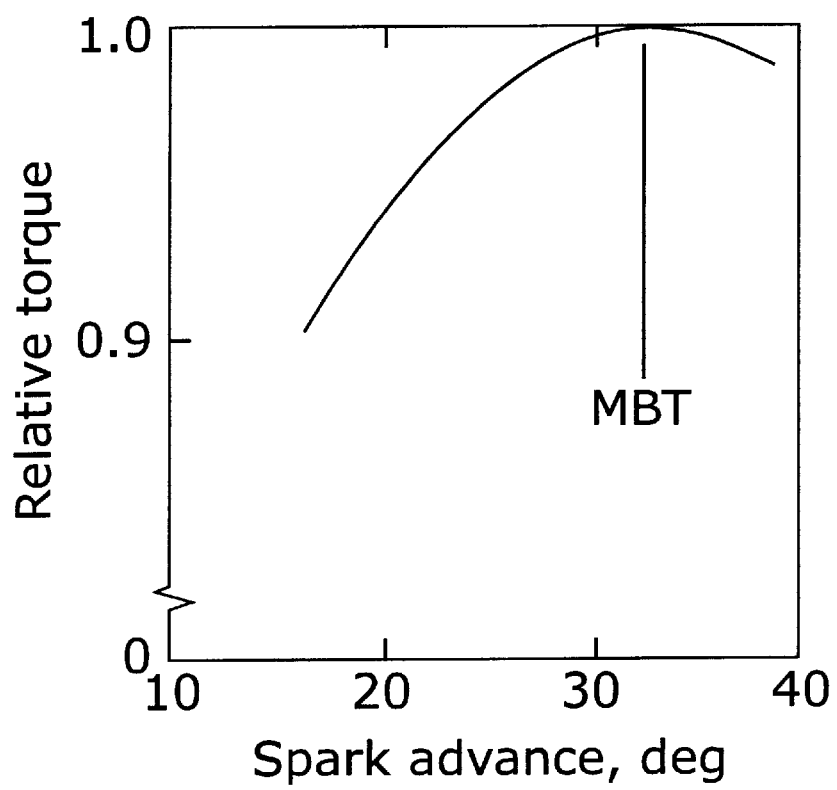
FIG. 3 is a graph illustrating the relationship of torque to ignition timing.

FIG. 3 shows the effect of spark timing on torque for a constant speed and air-fuel mixture. It will be seen that there is an optimum torque (MBT) at approximately 30° spark advance for this set of conditions.

Figure 4:
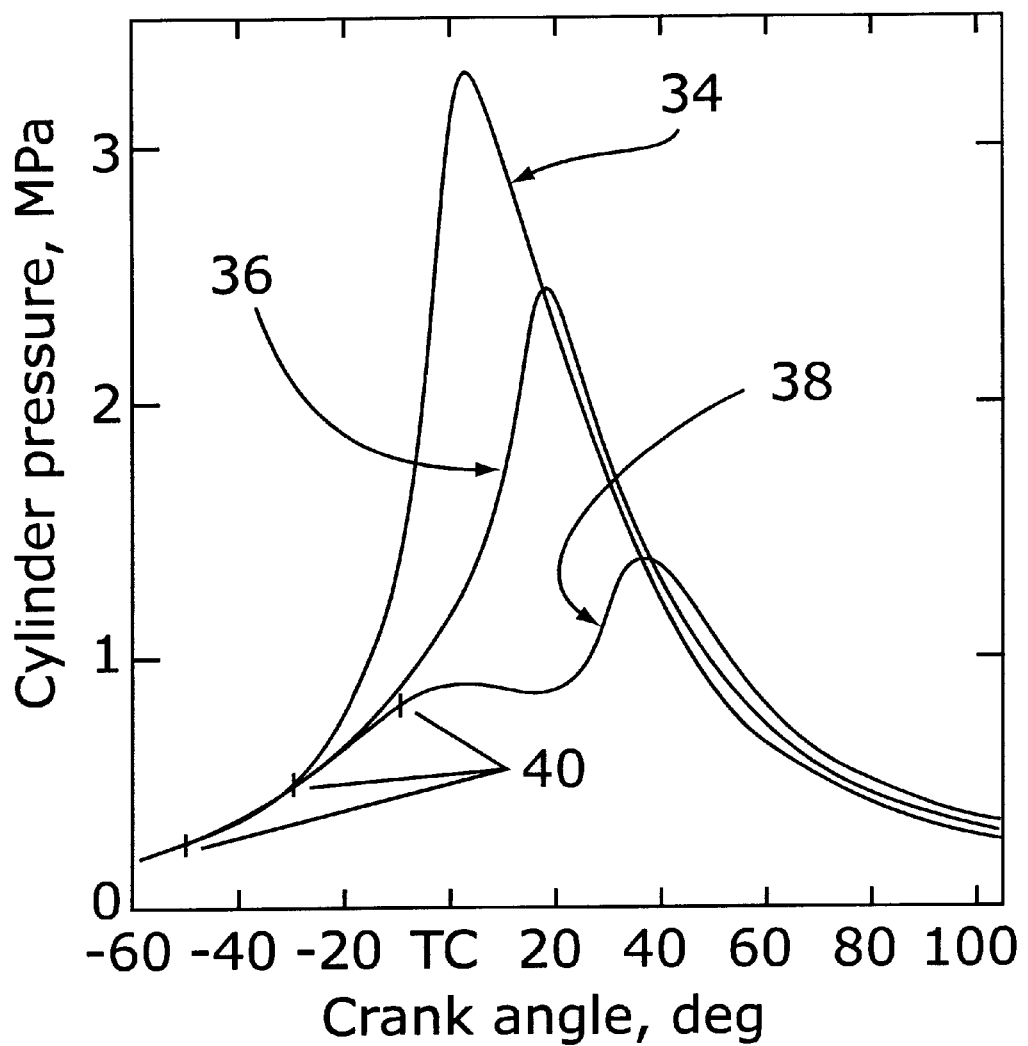
FIG. 4 is a graph illustrating the pressure profiles produced by different ignition timings.

FIG. 4 illustrates the effect of ignition timing on cylinder pressure profile. Three curves of cylinder pressure vs. crank angle are shown: overadvanced ignition at 50° crank angle 34, approximately MBT ignition at 30° crank angle 36, and retarded ignition at 10° crank angle 38. The ignition point is shown as 40 on each curve. These data show that sensing the pressure and pressure rate in the cylinder after ignition can give a direct indication of how close the spark was to MBT. Subsequent ignition timing can then be adjusted accordingly.

Figure 5:
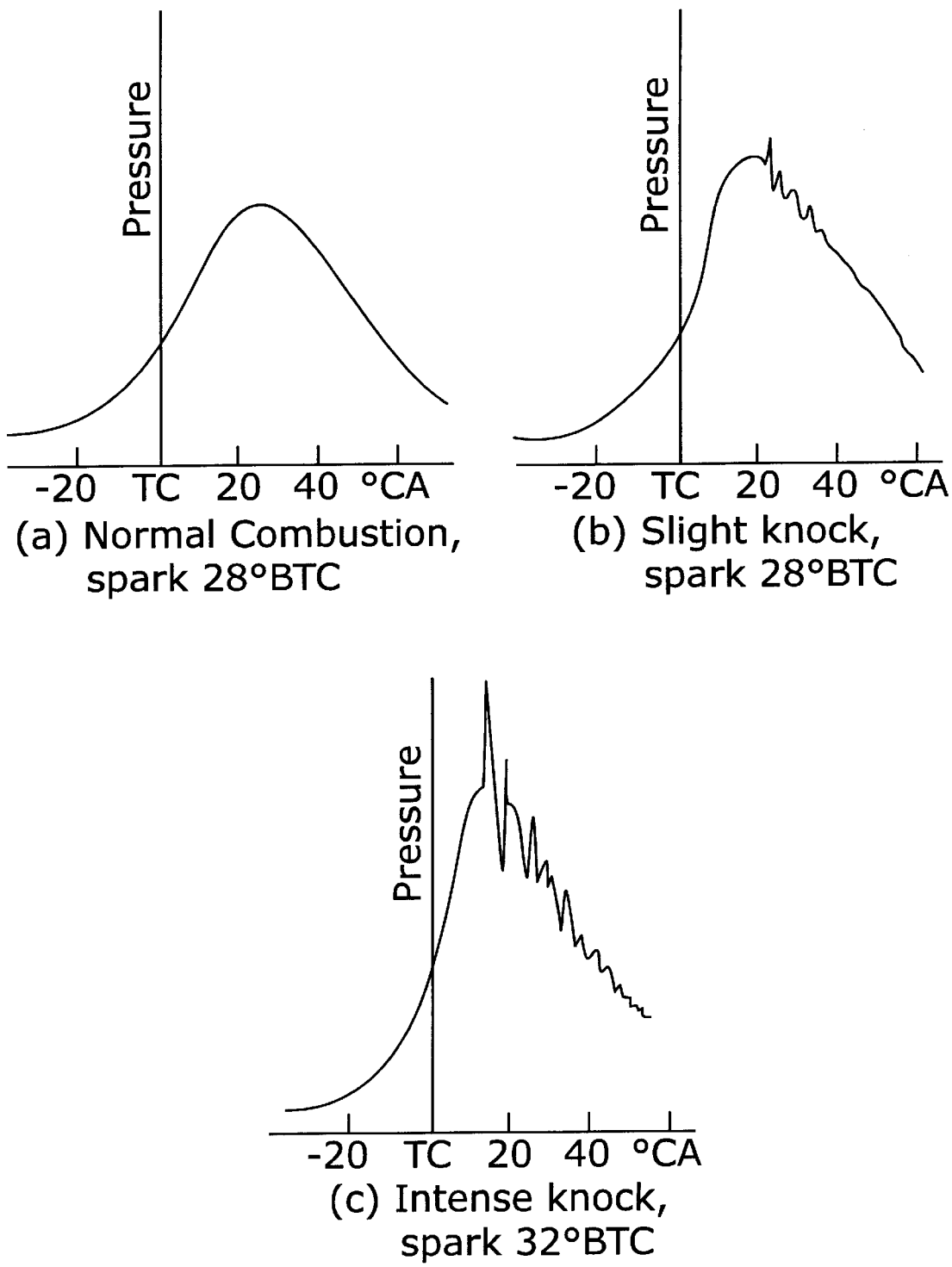
FIGS. 5A–5C show the pressure profiles for normal combustion, mild knock, and severe knock.

The pressure sensor data can also be used to identify combustion anomalies such as misfires and knock. The pressure increase associated with combustion will not be seen in the case of a misfire. Autoignition (knock) pressure profiles are illustrated in FIG. 5 which shows pressure vs. crank angle data for three cycles. FIG. 5a shows a normal combustion pressure curve (spark timing at 28°), which is smooth throughout.

FIG. 5b shows a typical curve for mild knock (spark timing at 28°), showing pressure instabilities during expansion. FIG. 5c shows a typical curve for severe knock (spark timing at 32°), with an extreme pressure peak and large fluctuations during expansion. These anomalies can be detected and avoided in subsequent cycles by monitoring the cylinder pressure profile.

Logic circuits for timing control may be simple or complex, and may be located within the spark plug or integrated with the engine controller. In the simplest embodiments of the invention, timing may be set entirely by crank angle and measured pressure data may be limited to autoignition detection or eliminated entirely. More advanced logic circuits may use detailed pressure profile data from previous cycles, and all of crank angle, pressure data, and pressure rate data from the instant cycle to time the spark. Data may also be transferred to the engine controller to adjust fuel mixture as well as timing. When logic is incorporated into the spark plug itself, it may be powered by an internal source or by the engine battery or another external source.

In addition to providing pressure data for timing control, the piezoelectric element also provides the raw charge necessary for the spark. With reference to FIG. 1 and as described above, as gases enter the pressure chamber 14 via the inlet 12, the piezoelectric element 16 strains, thereby developing a voltage across its poles. The negative pole 18 of the element 16 is electrically connected to the ground electrode 42, while the positive pole 20 is electrically connected to the switch 30, which is in turn electrically connected via the heat shield 24 to the center electrode 44. The piezoelectric element 16 is designed so that the voltage developed during a normal compression cycle is sufficient to create the spark between the electrodes 42 and 44 when switch 30 is closed. Thus, the mechanical energy of the combustion gases is converted to electrical energy, which is used to unleash the chemical energy of the combustion gases.

There are a number of materials suitable for the piezoelectric element, including but not limited to PZT-based materials in both polycrystalline and single crystal form. The voltage developed may be increased by the geometry of the piezoelectric element 16, as discussed more fully below with reference to FIG. 7, or by including a striker 22, as discussed above.

Figure 6:
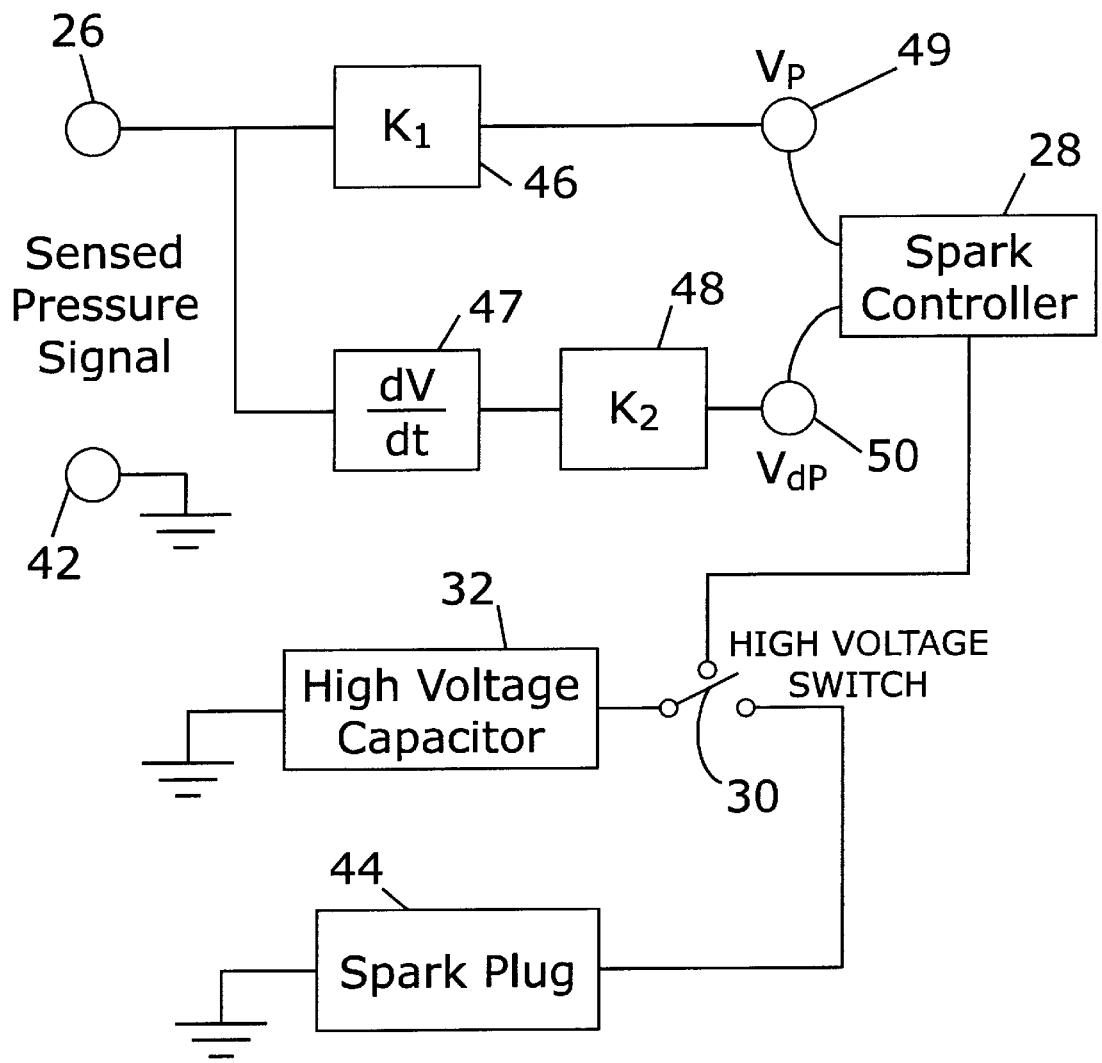
FIG. 6 is a detail of the spark plug showing the relationship of the piezoelectric element, a capacitor, and a switch for timing ignition.

In some embodiments, the charge may be stored in a capacitor 32 until a switch 30 is closed to cause the spark; an illustrative circuit diagram is shown in FIG. 6. In that figure, a sensed pressure signal is determined by the voltage difference between the sense electrode 26 and the ground electrode 42. The signal is split, and one signal is gained 46 and sent to the controller 28 as pressure data 49. The other signal is differentiated 47, gained 48, and sent to the controller 28 as pressure rate data 50. The high voltage signal is sent to a high voltage capacitor 32, until the controller sends a signal to close switch 30. This discharges the capacitor 32 through the center electrode 44, causing the spark.

Figure 7:
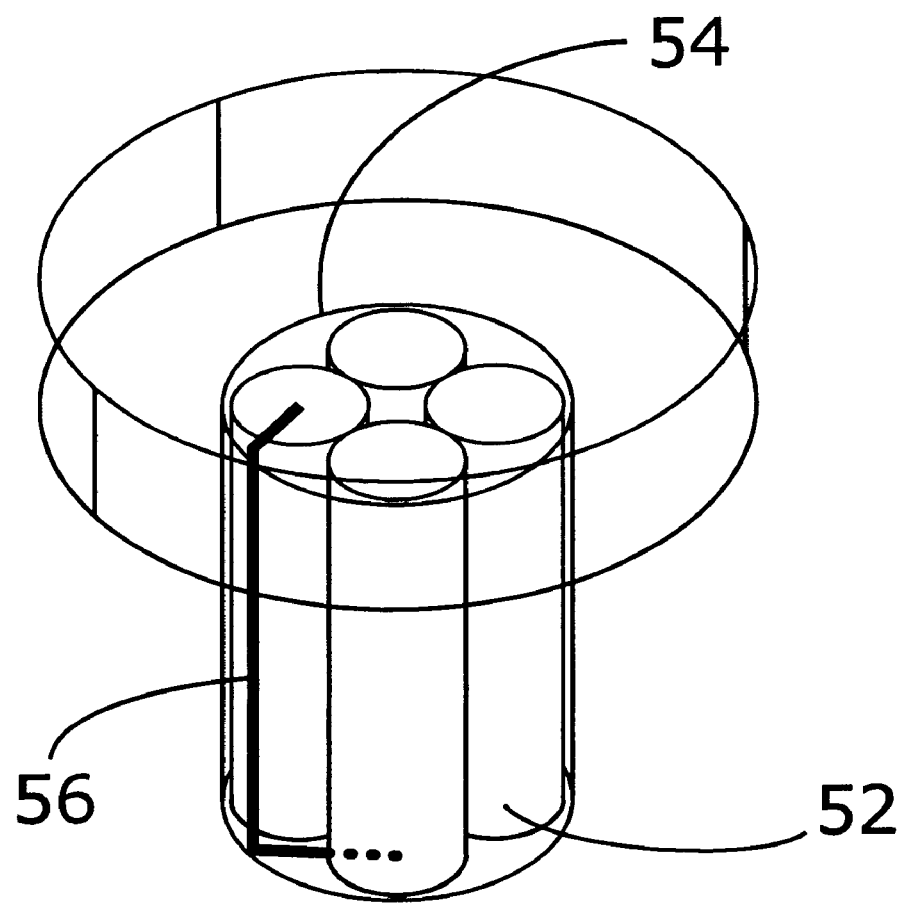
FIG. 7 shows a configuration for amplifying the effective length of the piezoelectric element.

As a first order approximation, the voltage developed across the piezoelectric element can be written as $$V = \left( P \frac{A_{pressure\ plate}}{A_{piezo}} \right) g_{33} l \qquad (1)$$

where V represents voltage, P represents chamber pressure, $A_{piezo}$ represents the cross-sectional area of the piezoelectric element, $A_{pressure\ plate}$ represents the cross-sectional area of the plate transmitting pressure to the piezoelectric element, $g_{33}$ represents the piezoelectric constant of the element material in the axial direction, and l represents the effective length of the element. The quantity in parentheses represents the stress on the piezoelectric element. The effective length of the element can be increased by wiring multiple elements in series, as illustrated in FIG. 7. That figure shows a piezoelectric element 16, which comprises four piezoelectric subelements 52 wired in series.

When a pressure is developed in the combustion chamber, straining the element 16, each subelement 52 is equally strained, and develops a voltage according to Equation (1). The subelements 52 are electrically insulated from one another, for example, by embedding them in a high dielectric epoxy 54. They may also be wrapped in an insulating tape such as Kaptonm™. They are then wired 56 end-to-end in series, in essence producing the equivalent of a piezoelectric element having four times the overall length of the assembly. This increased effective length of the piezoelectric element not only allows the element to develop sufficient voltage to produce a spark, but it enhances the sensitivity of the element in its role as a pressure sensor.

It is important that the spark plug be designed so that the temperature of the piezoelectric element does not rise above the Curie temperature of the material. This may be accomplished by providing insulating material to shield the element from the hot combusted gases. In the embodiment illustrated in FIG. 1, the communications port is long enough to prevent the heat of the gases from heating the piezoelectric element excessively. Active cooling systems may be desirable for some engines.

The embodiment of the invention illustrated in FIG. 1 also includes a heat shield 24. The shield comprises a material having high electrical conductivity but low thermal conductivity, thereby providing a thermal barrier between the hot gases in the cylinder and the piezoelectric element 16. There are many materials suitable for use as heat shields; some exemplary materials are listed in Table 1, but many others are also suitable for the practice of the invention.

TABLE 1

Heat Shield Materials

| Type | Manufacturer | Trade Name |
|---|---|---|
| Silver inorganic Binder System | Aremco Products | Pyro-duct ™ 597 |
| Nickel Inorganic Binder System | Aremco Products | Pyro-duct ™ 593 |
| Titanium Boride | ESK Engineered Ceramics | Titanium Boride Shapes I |
| Zirconium Diboride Nickel-Base Alloy | ESK Engineered Ceramics | Zirconium Diboride Hastelloy ™ X (UNS N06002) |
| Iron-chromium-Nickel Alloy | | A-286 (UNS S66286) |
| Boron Carbide | ESK Engineered Ceramics | Tetrabor ™ BT |

With proper attention to selection of a material for the piezoelectric element, cooling of the element, and prevention of any degradation of the element which may be caused by spark generation or by fatigue, spark plugs according to the invention may be used over long periods in engines running at high RPMs. These spark plugs provide a new avenue for controlling engine timing, allow the elimination of high-voltage lines, coils, and distributors from engines, and decrease the load on generators.

Other embodiments of the invention will be apparent to those skilled in the art from a consideration of the specification or practice of the invention disclosed herein. It is intended that the specification be considered as exemplary only, with the true scope and spirit of the invention being indicated by the following claims.

What is claimed is:

1. A spark plug for an internal combustion engine, comprising:
    a piezoelectric element responsive to cylinder pressure, wherein the element generates a voltage sufficient to produce a spark to ignite a fuel-air mixture in response to an increase in cylinder pressure, and
    an output for for measuring pressure response of the piezoelectric element to detect combustion performance.

2. The spark plug of claim 1, further comprising a striker which impacts the piezoelectric element in response to an increase in cylinder pressure, thereby increasing the voltage generated by the piezoelectric element.

3. The spark plug of claim 2, wherein the striker impact is transmitted to the piezoelectric element through an electrode.

4. The spark plug of claim 1, wherein the piezoelectric element comprises a plurality of subelements which combine to generate a voltage equal to the sum of voltages developed by each subelement.

5. The spark plug of claim 1, wherein the piezoelectric element comprises lead zirconate titanate.

6. The spark plug of claim 1, wherein the piezoelectric element is electrically connected to an electrode via a heat shield.

7. The spark plug of claim 6, wherein the heat shield comprises a material selected from the group consisting of nickel base alloys, iron-chromium-nickel alloys, titanium boride, zirconium diboride, boron carbide, and metal-inorganic binder systems.

8. The spark plug of claim 1, further comprising means for timing the production of the spark.

9. The spark plug of claim 8, wherein the spark timing for a single cylinder is determined by at least one of cylinder pressure, cylinder pressure rate, and crank angle for that cylinder.

10. The spark plug of claim 9, wherein the timing means includes a logic element which controls the spark timing.

11. The spark plug of claim 8, wherein the timing means is responsive to a signal from an engine controller for determining spark timing.

12. The spark plug of claim 8, wherein the timing means comprises a capacitor for storing charge generated by the piezoelectric element.

13. A method of igniting a fuel-air mixture in an internal combustion engine, comprising:
    compressing the fuel-air mixture in a combustion chamber in communiction with a piezoelectric element, whereby the increased pressure of the fuel-air mixture causes the piezoelectric element develop a voltage across its poles, which is used to produce a spark which ignites the fuel-air mixture;
    using the piezoelectric element to monitor the pressure of the fuel-air mixture; and
    using the monitored pressure to control spark timing.

14. The method of claim 13, wherein increased pressure in the combustion chamber causes a striker element to impact the piezoelectric element, thereby generating a voltage.

15. The method of claim 13, further comprising storing charge from the developed voltage in a capacitor, and discharging the capacitor to produce the spark.

16. The method of claim 15, wherein the capacitor is discharged at a time determined by monitoring at least one of the group consisting of cylinder pressure, cylinder pressure rate, and crank angle.

17. A method of monitoring engine performance in an engine comprising a spark plug comprising a piezoelectric element responsive to cylinder pressure, wherein the element generates a voltage sufficient to produce a spark to ignite a fuel-air mixture, comprising
    monitoring the electrical response of the piezoelectric element to cylinder pressure after ignition to detect combustion performance.

18. The method of claim 17, further comprising adjusting spark timing in response to detection of combustion performance.

19. A spark plug for an internal combustion engine, comprising:
    a piezoelectric element responsive to cylinder pressure, wherein the element generates a voltage sufficient to produce a spark to ignite a fuel-air mixture in response to an incresе in cylinder pressure, wherein the piezoelectric element comprises a plurality of subelements in electrical series relation, wherein each subelement responds to the cylinder pressure independently.

* * * * *